United States Patent
Seo

[19]

[11] Patent Number: 6,160,925
[45] Date of Patent: Dec. 12, 2000

[54] DATA SYMBOL READER HAVING AN OPTICAL SYSTEM

[75] Inventor: Shuzo Seo, Tokyo, Japan

[73] Assignee: Asahi Kogaku Kogyo Kabushiki Kaisha, Tokyo, Japan

[21] Appl. No.: 08/933,362

[22] Filed: Sep. 18, 1997

[30] Foreign Application Priority Data

Sep. 20, 1996 [JP] Japan .................................. 8-269091

[51] Int. Cl.[7] ........................................................ G06K 7/00
[52] U.S. Cl. ........................ 382/312; 382/313; 235/472; 356/123
[58] Field of Search ..................................... 382/312, 313, 382/314, 315, 209, 255; 358/473; 235/472, 462, 455; 356/4.03, 123

[56] References Cited

U.S. PATENT DOCUMENTS

| | | | |
|---|---|---|---|
| 4,115,703 | 9/1978 | Dobras | 382/313 |
| 4,542,528 | 9/1985 | Sanner et al. | 382/313 |
| 4,716,291 | 12/1987 | Sakamoto et al. | 382/313 |
| 4,947,261 | 8/1990 | Ishikawa et al. | 382/313 |
| 5,121,226 | 6/1992 | Kubota et al. | 382/313 |
| 5,130,847 | 7/1992 | Tsujioka | 382/312 |
| 5,179,269 | 1/1993 | Horie et al. | 235/455 |
| 5,378,883 | 1/1995 | Batterman et al. | 235/472 |
| 5,600,116 | 2/1997 | Seo et al. | 235/455 |
| 5,702,059 | 12/1997 | Chu | 235/462 |
| 5,739,518 | 4/1998 | Wang | 382/209 |

FOREIGN PATENT DOCUMENTS

| | | | |
|---|---|---|---|
| 8-32849 | 2/1996 | Japan | H04N 5/225 |
| 2164187 | 3/1986 | United Kingdom | G06K 9/22 |

OTHER PUBLICATIONS

"Optical System for Uniform Light Distribution" Cunningham et al. IBM Technical Bulletin vol. 18. No. 12 May 1976.

Primary Examiner—Matthew C. Bella
Attorney, Agent, or Firm—Greenblum & Bernstein P.L.C.

[57] ABSTRACT

A non-contact type data symbol reader is provided which includes a light projecting system for projecting an optical image defining an area capable of being read onto a readout surface. When an infocus image is formed on the readout surface by the light projecting system, the data symbol reader is being held at a distance from the readout surface where an infocus image of the symbol to be read is obtained.

40 Claims, 8 Drawing Sheets

DATA SYMBOL READER HAVING AN OPTICAL SYSTEM

BACKGROUND OF THE INVENTION

The present invention relates to a data symbol reader for reading encoded information, such as a data symbol, and, in particular, to a non-contact type data symbol reader, that is, a data symbol reader that is not brought into contact with a plane of the data symbol in the reading process. The present invention is particularly applicable to a data symbol reader for reading a two-dimensional data symbol, such as a monochrome mosaic pattern.

In general, when a data symbol is to be read, the data symbol reader is brought into contact with a surface on which the two-dimensional data symbol is formed and is arranged such that, in this position, an image of the data symbol is formed on a CCD (Charge Coupled Device) by an imaging lens. This arrangement is referred to as a contact type data symbol reader.

However, in order to increase the range of use of a data symbol reader, recent designs have been directed to a non-contact type data symbol reader in which the data symbol reader does not have to be brought into contact with the surface on which the two-dimensional data symbol is formed.

However, with the non-contact type data symbol reader, because symbol reader is held at a distance from the plane of the data symbol, it is not easy for a user to ensure that a data symbol is in a symbol read area. That is, for a contact-type data symbol reader, a data symbol can be easily positioned in the symbol read area because the data symbol reader is close to or brought into contact with the plane of the data symbol, whereas for a non-contact type data symbol reader, the symbol read area is not defined in the plane of the data symbol.

SUMMARY OF THE INVENTION

It is therefore an object of the present invention to provide an improved data symbol reader, and in particular, a non-contact type data symbol reader with which data symbols can be easily positioned in a symbol read area.

According to an aspect of the present invention, there is provided, a data symbol reader comprising an image pickup element, and image forming optical system, and illuminating means. The image forming optical system is for forming an image of a data symbol, which is on a readout surface, on a light receiving surface of the image pickup element. The illuminating means is for illuminating a symbol read area capable of being read out, and for optically defining the symbol read area.

Because the illuminating means defines the symbol read area, a user may ensure that the data symbol is in the symbol read area prior to reading the data symbol. Further, because the illuminating means both illuminates and defines the symbol read area, separate devices for illumination and defining are not required consequently the data symbol reader may be more compact and less expensive.

In a particular case, the illuminating means may be constructed so as to indicate an outer frame portion of the symbol read area. In this case, it is particularly easy for a user to ensure that the data symbol is in the symbol read area. In particular, a brightness of the outer frame portion of the symbol read area may be higher than a brightness of an inside portion. Alternatively, a color of the outer frame portion of the symbol read area may be different from a color of an inside portion.

Further, it is preferable that the illuminating means includes a projecting optical system for projecting light from the light source onto the readout surface. A part of an optical axis of the light from the light source may coincide with an optical axis of the image forming optical system.

When the projecting optical system is used, the projecting optical system may include a lens for causing the light from the light source to form an image on the readout surface. The projecting optical system should preferably be constituted such that the infocus image is formed on the readout surface when the symbol reader is held at a distance from the readout surface where an infocus image of the symbol to be read is formed on the light receiving surface of the image pick-up element.

Further, the light source may be a plane light source constructed such that the light is emitted from a plane. In this case, the plane light source preferably includes a diffusion plate. A transmissivity of a part of the diffusion plate corresponding to an outer frame portion of the symbol read area is set higher than that of a part of the diffusion plate corresponding to an inside portion.

DETAILED DESCRIPTION OF THE PREFERRED EMBODIMENTS

A data symbol reader according to a first embodiment of the present invention will be described with reference to FIGS. 1 to 8.

Figure 1:
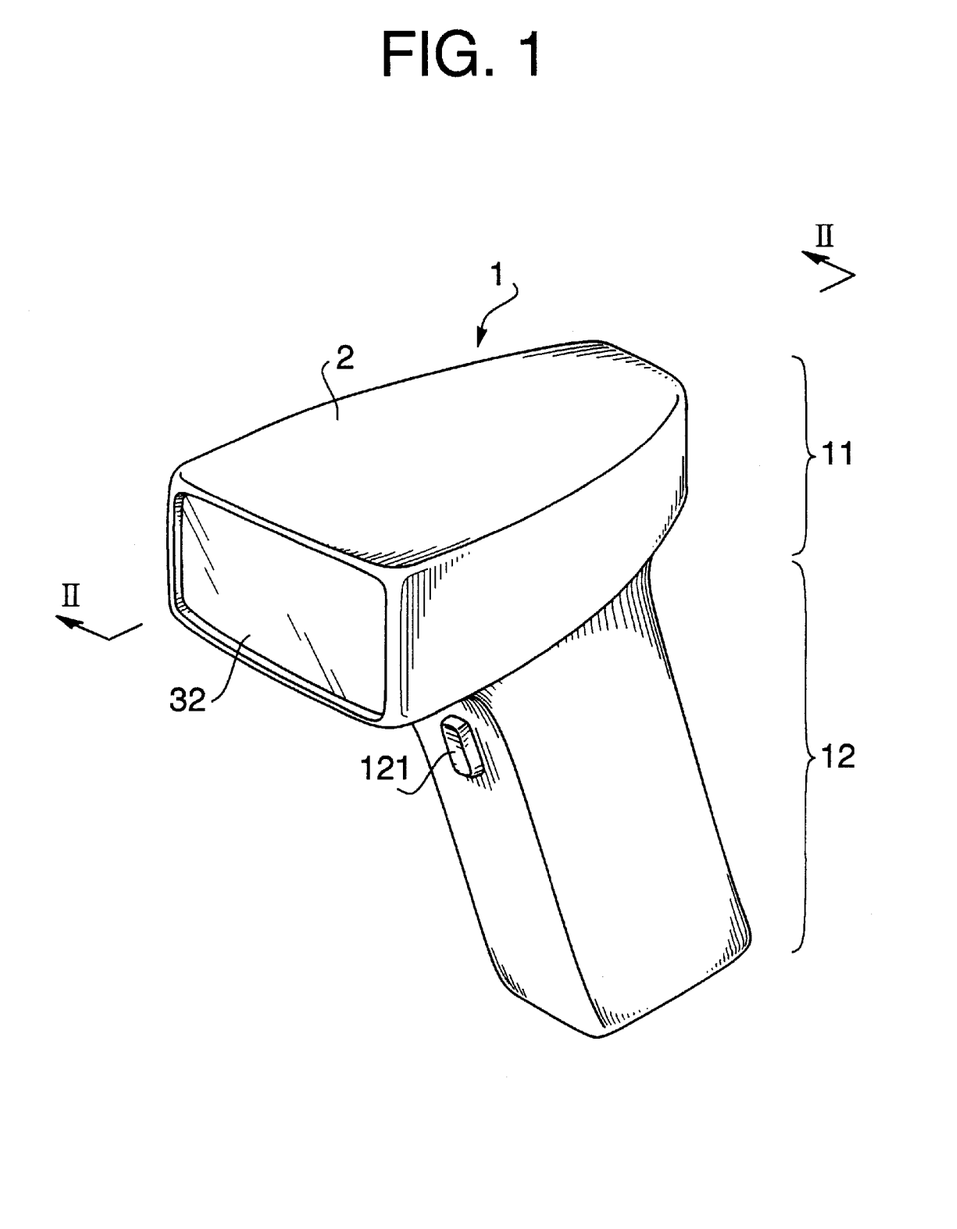
FIG. 1 is a perspective view showing a data symbol reader according to an embodiment of the present invention.
Figure 2:
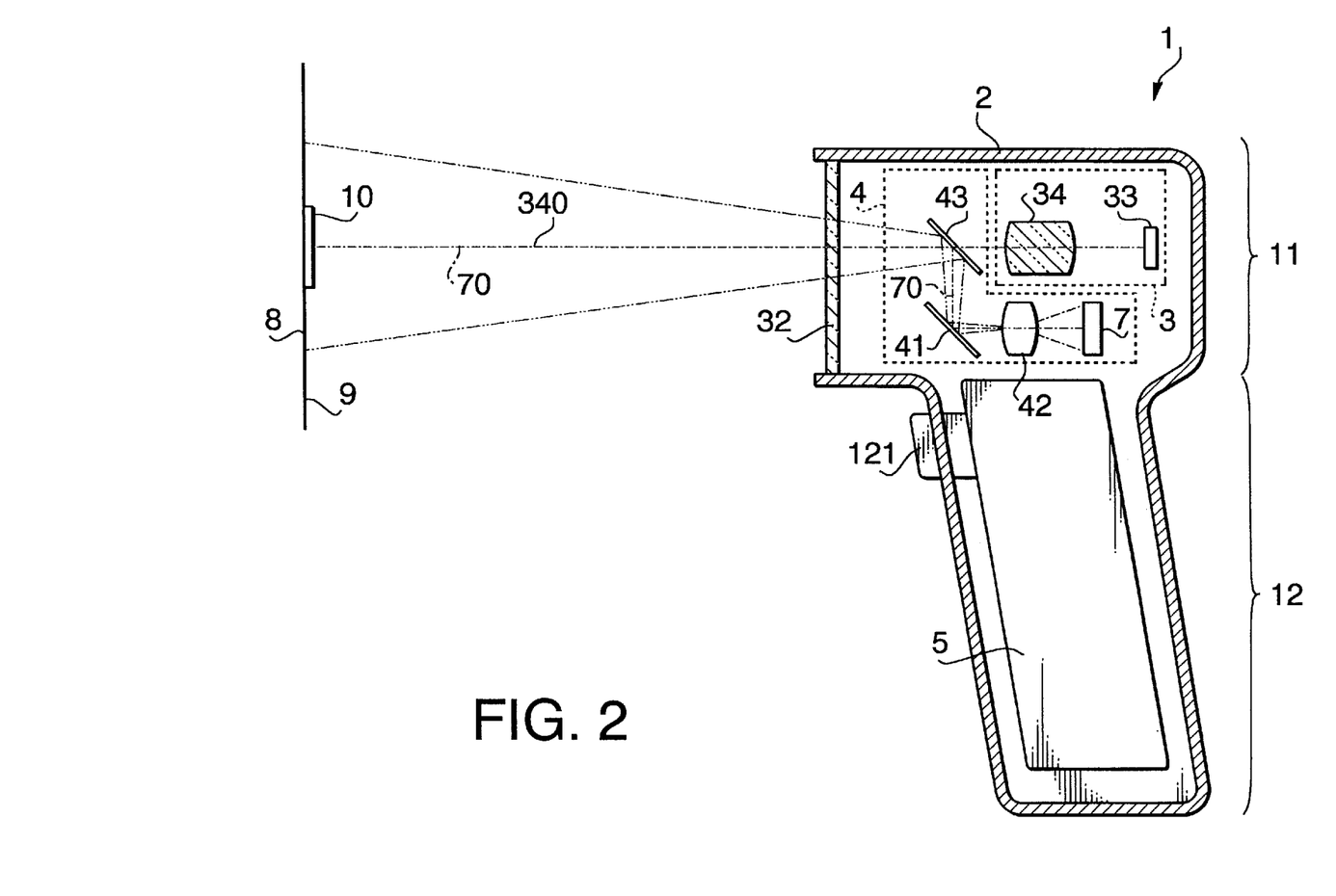
FIG. 2 is a sectional view taken along line II—II of FIG. 1.

FIG. 1 is a perspective view of a data symbol reader 1 according to an embodiment of the present invention. FIG. 2 is a sectional view of the data symbol reader 1 taken along line II—II of FIG. 1.

As shown in FIG. 1, the data symbol reader 1 includes a casing 2. The casing 2 includes a longitudinal grip portion 12 which is gripped with a hand and a head portion 11 formed at an end of the grip portion 12.

As shown in FIG. 2, the grip portion 12 is provided with a trigger switch 121 for starting a reading operation and houses a processing section 5 for processing an image that has been read. Further, the head portion 11 houses a reading section 3 for reading an image of a data symbol and an illumination section 4.

The head portion 11 is further provided with a transmission plate 32 at a front portion (left end in FIG. 2) thereof. The transmission plate 32 prevents dust and the like from entering the head portion 11 but allows light to pass through. The transmission plate 32 may be, for example, a plastic plate or a glass plate.

The reading section 3 includes an image pickup element 33 and an image pickup lens 34 to form an image of a symbol read area 8 on a light-receiving surface of the image pickup element 33. The image pickup element 33 is, for example, a photoelectric conversion element for converting an amount of received light into an electric signal. In the embodiment, a CCD 33 (charge coupled device) is used.

The symbol read area 8 represents a region on a readout surface 9 (surface on which a data symbol 10 is positioned), which is imaged by the image pickup lens 34 on the CCD 33. In this embodiment, the symbol read area 8 is set to be sufficiently larger than the data symbol 10.

As described above, the data symbol reader 1 also includes the illumination section 4. As described in more detail below, the illumination section 4 illuminates and frames the symbol read area 8.

The illumination section 4 includes a plane light source 7, an image forming lens 42 for converging light emitted from the plane light source 7, a mirror 41, and a half mirror 43.

Figure 3:
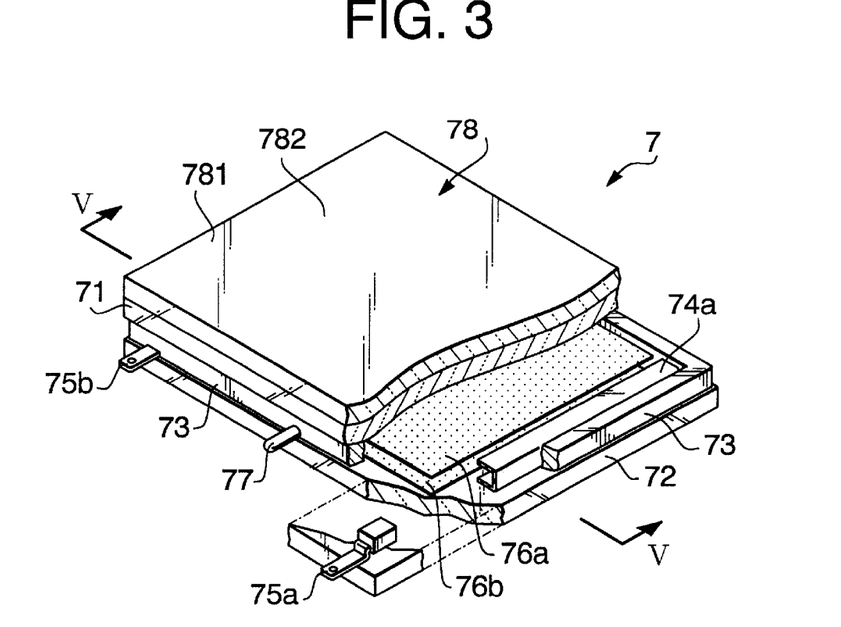
FIG. 3 is a perspective cut-away view of a plane light source of the data symbol reader of FIG. 1.
Figure 4:
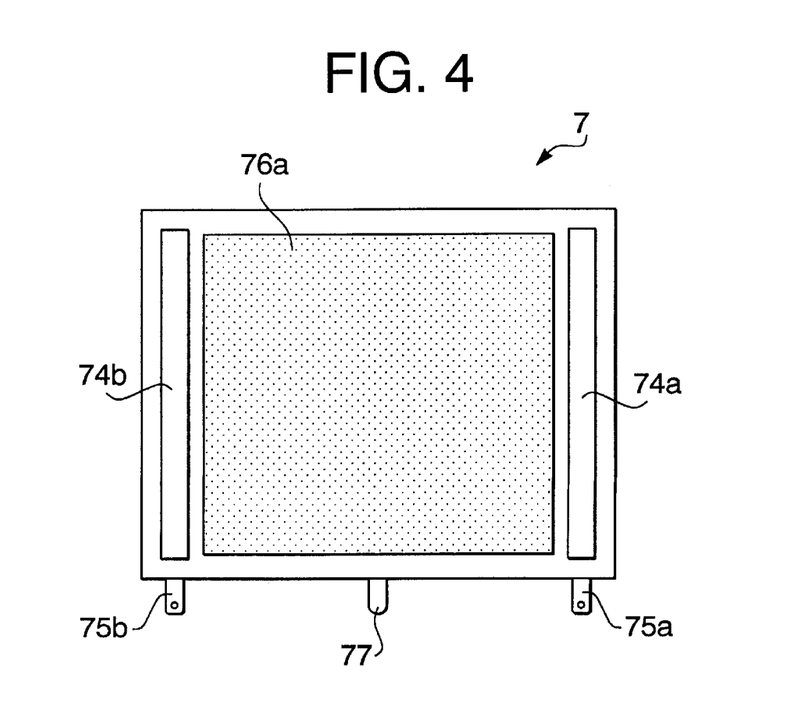
FIG. 4 is a plan view showing an inner structure of the plane light source shown in FIG. 3.

FIG. 3 is a perspective view of the plane light source 7, in this embodiment, a flat cold cathode tube light source such as a flat fluorescent lamp. FIG. 4 is a plan view showing an internal structure of the plane light source 7, and FIG. 5 is a sectional view taken along line V-V in FIG. 3.

Figure 5:
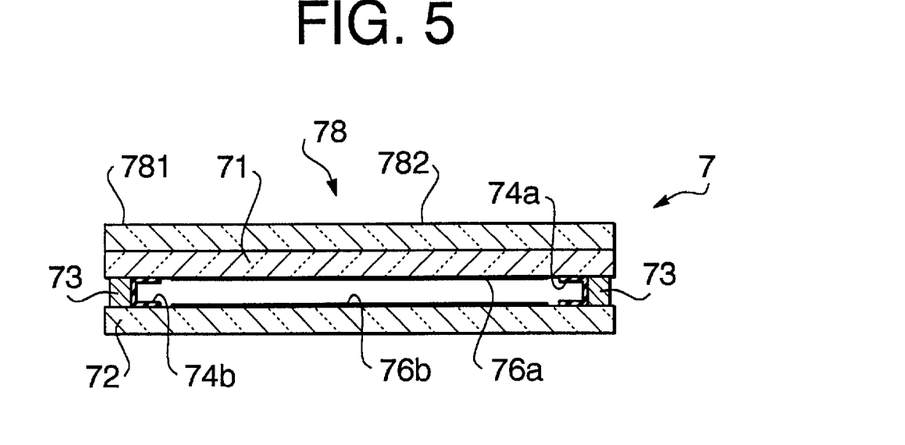
FIG. 5 is a sectional view taken along line V—V of FIG. 3.

As shown in FIGS. 3 to 5, the plane light source 7 includes a pair of discharge electrodes 74a and 74b disposed in a glass container in which a mixed gas of mercury vapor and argon gas is sealed. The plane light source 7 uses plane uniform glow discharge. The shape of the plane light source 7 determines the shape of the symbol read area 8.

The glass container includes a flat (plate like) front lass panel 71, a flat (plate like) rear glass panel 72, a frame glass 73, and an exhaust pipe 77. The frame glass 73 is disposed between the front glass panel 71 and the rear glass panel 72. The frame glass 73 acts as a spacer, so that a predetermined space is formed between the front glass panel 71 and the rear glass panel 72. The exhaust pipe 77 is used for vacuum evacuation or introduction of argon gas when manufacturing the plane light source 7. In FIGS. 3 and 4, the exhaust pipe 77 is the remainder after the exhaust pipe 77 has been cut and sealed.

A diffusion plate (frosted glass) 78 described below is disposed on the upper side (in the view of FIG. 3) of the front glass panel 71.

Fluorescent films 76a and 76b are provided on inner surfaces of the front glass panel 71 and the rear glass panel 72, respectively. The fluorescent films 76a and 76b are formed of, for example, three-wavelength fluorescent substances having good color rendition, such as blue, green and red fluorescent substances.

The pair of discharge electrodes 74a and 74b are disposed at opposite ends in the glass container, parallel with each other. The pair of discharge electrodes 74a and 74b may be, for example, a cold cathode discharge electrode.

Lead electrodes 75a and 75b are connected to the discharge electrodes 74a and 74b, respectively.

When a predetermined voltage is applied to the discharge electrodes 74a and 74b through the lead electrodes 75a and 75b, the plane light source 7 is turned on, so that light radiates from the surface of the diffusion plate 78.

Figure 6:
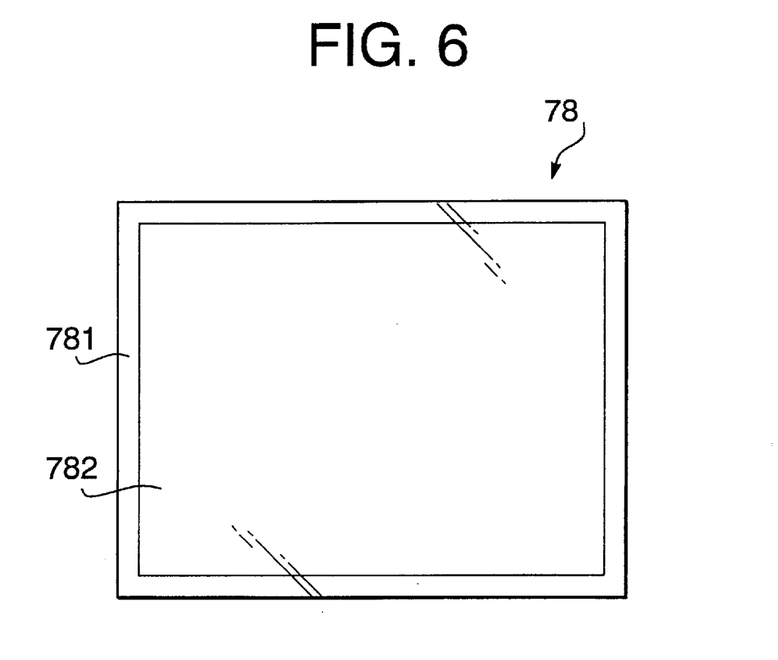
FIG. 6 is a plan view showing a diffusion plate of the plane light source shown in FIG. 3.

FIG. 6 is a plan view of the discharge plate 78 of the plane light source 7 shown in FIG. 3. As shown in FIG. 6, the diffusion plate 78 includes a diffusion surface 781 corresponding to an outer frame portion 81 of the symbol read area 8 (see FIG. 8, described below), and a diffusion surface 782 corresponding to an inside portion 82 of the symbol read area 8 (see FIG. 8). That is, the shape of the diffusion surface 781 and the diffusion surface 782 of the diffusion plate 78 are similar to the shape of the corresponding outer frame portion 81 and inner portion 82 of the symbol read area B.

The transmissivity of the diffusion plate 78 is set so that the diffusion surface 781 has a larger (higher) transmissivity than the diffusion surface 782. Thus, an image of the plane light source 7 on the readout surface 9 is such that the brightness on the outer frame portion 81 of the symbol read area 8 is higher than that of the inside portion 82 thereof, so that the size of the symbol read area 8 is easily determined by a user.

The plane light source 7 is disposed in the vicinity of an optical axis 340 of the image pickup lens 34. In particular, in this embodiment, as shown in FIG. .2, light from the plane light source 7 passes through the image forming lens 42, is reflected by the mirror 41, and is then reflected by the half mirror 43. The half mirror 43 is disposed on the optical axis 340 of the image pickup lens 34 between the image pickup lens 34 and the transmission plate 32 such that the light from the plane light source 7 is reflected by the half mirror 43 so that the optical axis 70 of the light coincides with the optical axis 340 of the image pickup lens 34. Thus, the reflected light is projected onto the readout surface 9.

The magnification, focal distance, position, and the like of the image forming lens 42 are set so that, when the data symbol reader 1 is held at a distance where an in-focus image of the data symbol 10 is formed on the light receiving surface of the CCD 33, the image forming lens 42 causes the light from the plane light source 7. to form an in-focus image of the plane light source 7 on the readout surface 9. In particular, the image of the plane light source 7 indicates the symbol read area 8 (the outer frame portion 81 and the inside portion 82 of the symbol read area 8). In other words, at the distance where the in-focus image of the data symbol 10 is formed on the light receiving surface of the CCD 33, the image of the plane light source 7 is focused (i.e., has a minimum area) and illuminates and defines the symbol read area 8 on the readout surface 9.

In this case, the depth of field of the image forming lens 42 is made comparable with or shallower than the depth of field of the image pickup lens 34 so that the focused state of the plane light source 7 will be clearer, allowing easier focusing.

A user can easily adjust the distance between the readout surface 9 and the data symbol reader 1 so that the light from the plane light source 7 forms an in-focus image of the plane light source 7 on the readout surface 9. That is, the data symbol reader 1 is moved relative to the readout surface 9 (preferably, moved along the optical axis 340 of the image pickup lens 34) until the in-focus image of the plane light source 7 is formed on the readout surface 9. If the distance between the readout surface 9 and the data symbol reader 1 is too large or too small, the light from the plane light source 7 does not form a clear image on the readout surface 9, that is, the image of the plane light source 7 is blurred and enlarged.

As described above, the grip portion 12 of the data symbol reader 1 houses the processing section 5.

Figure 7:
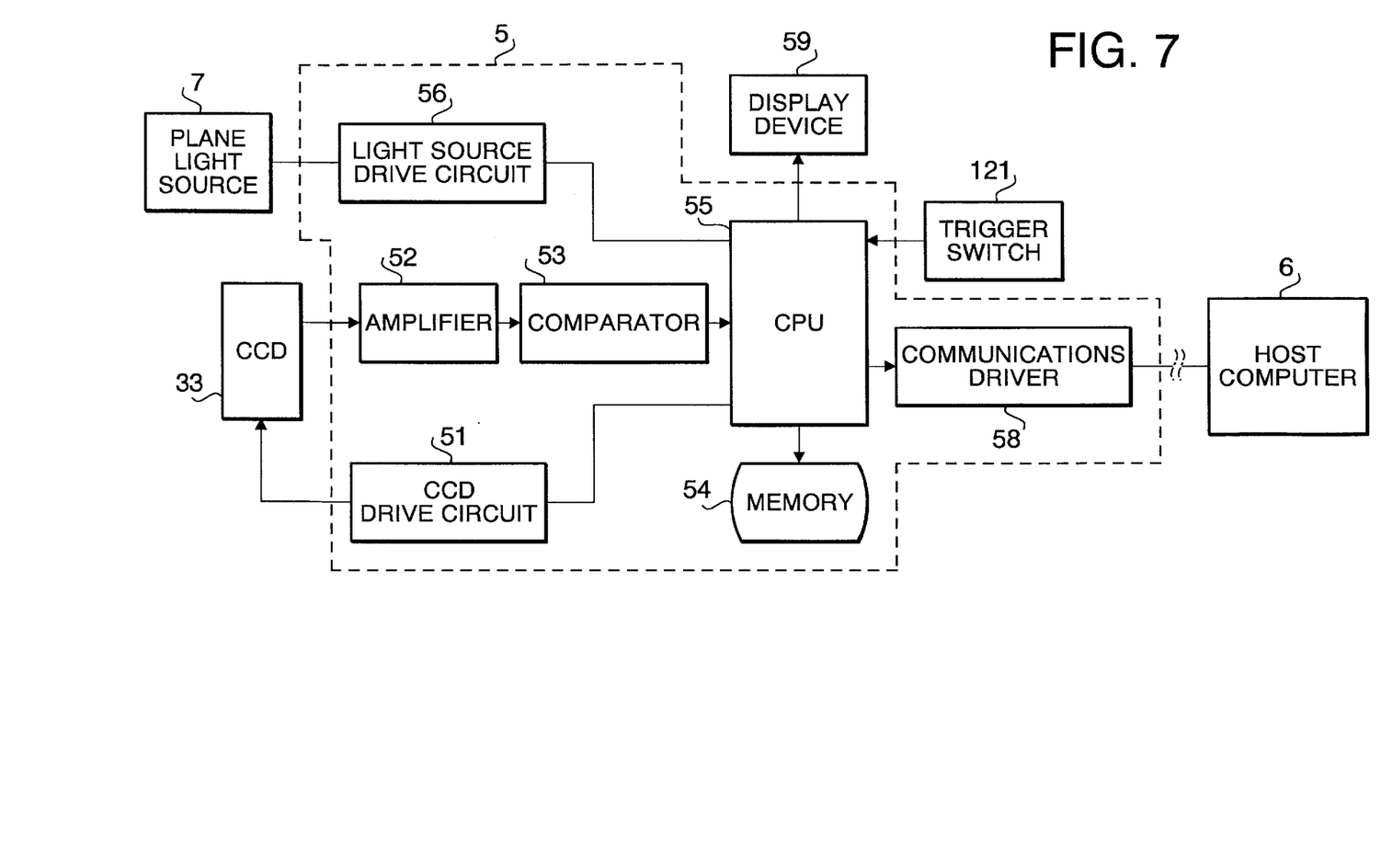
FIG. 7 is a block diagram of the processing section of the data symbol reader of FIG. 1.

FIG. 7 is a block diagram of the processing section 5. The processing section 5 includes a CCD drive circuit 51, an amplifier 52, a comparator 53, a memory 54, a controller, in this case, a CPU 55, a light source drive circuit 56, and a communications driver 58.

Based on input from the trigger switch 121, the controller 55 controls the light source drive circuit 56 to drive the plane light source 7. The controller 55 further controls the CCD drive circuit 51 to drive the CCD 33 to capture an image. The captured image signal is amplified by the amplifier 52, binarized by the comparator 53, and sent by the controller 55 to the memory 54. The controller 55 may then output the image signal to a host computer 6 or the like through the communications driver 58.

Further, as shown in FIG. 7, the data symbol reader 1 may include a display device 59, such as an LCD (Liquid Crystal Display) a CRT, or the like, connected to the controller 55 for displaying an image or control information.

Figure 8:
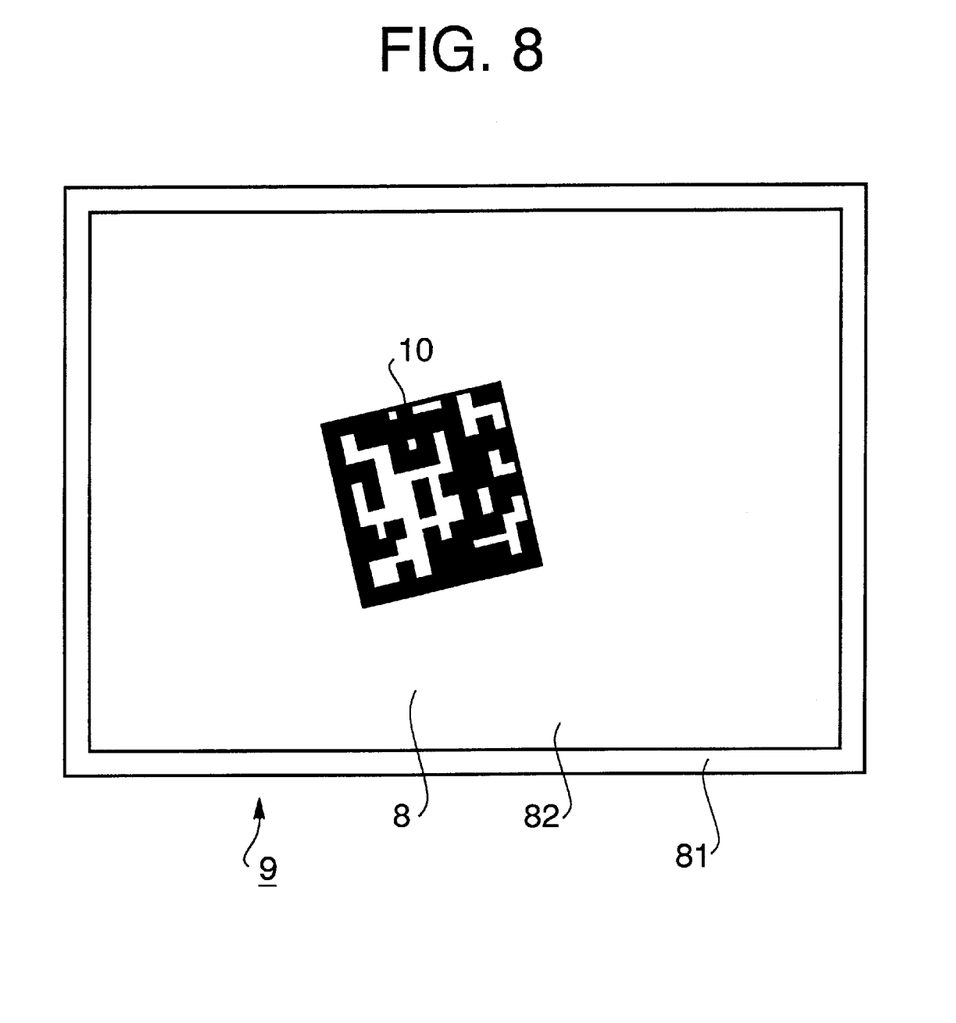
FIG. 8 is a top view of an object to be read.

FIG. 8 shows an example of an object to be read, in this embodiment, the data symbol 10. The data symbol 10 includes a mosaic of black and white (or transparent) cells arranged in n (rows)×m (columns) (n and m are integers equal to or greater than 2). In the embodiment, each black cell or white cell represents a 0 or 1 in a binary system such that information is provided by the combination of black cells and white cells in the data symbol 10.

When capturing an image of the data symbol 10, the data symbol reader 1 is positioned such that an in-focus image of the plane light source 7 is formed on the readout surface 9 to indicate the symbol read area 8. When the image of the plane light source 7 is substantially in-focus (i.e., within a predetermined range) and is projected on the data symbol 10, it may be assumed that the data symbol 10 is in position such that an in-focus image of the data symbol 10 can be captured.

The operation of the data symbol reader 1 is now described.

In the embodiment, the trigger switch 121 is designed as a two-step switch. When the trigger switch 121 is pushed through a first-step (i.e., to a half-press state), the data symbol reader 1 is set to a power ON state, and the light source drive circuit 56 drives the plane light source 7 to illuminate the symbol read area 8. That is, the light from the plane light source 7 is projected onto the readout surface 9. Thus as described above, the image of the plane light source 7 includes the high brightness portion indicating the outer frame portion, 81 of the symbol read area 8, and the normal brightness portion, indicating the inside portion 82 (see FIG. 8). A user then moves the data symbol reader 1 to position the data symbol 10 inside the inside portion 82 and adjusts the distance between the data symbol reader 1 and the readout surface 9 such that the image of the plane light source 7 is in an in-focus state.

The trigger switch 121 is then pressed through a second-step (i.e., to a full-press state) and the controller 55 controls the CCD drive circuit 51 such that an image signal, representing an image of the symbol read area 8 (including the data symbol 10) is captured. Either a field image and a frame image may be captured.

More specifically, the CCD drive circuit 51 outputs a CCD vertical drive pulse and a CCD horizontal drive pulse to the CCD 33 at a predetermined timing. The CCD vertical drive pulse is used as an operation timing signal of charge accumulation in the CCD 33. The CCD horizontal drive pulse is used as an operation timing signal of charge transfer to the amplifier 52. The CCD drive circuit 51 also generates a clock signal and sends a composite clock signal, obtained by combining a horizontal sync signal and a vertical sync signal with the clock signal, to the controller 55.

The captured image signals (analog signal) sequentially output from the CCD 33 are amplified by the amplifier 52 and converted into digital image signals by an A/D converter (not shown) to be input to the comparator 53. In the comparator 53, the converted digital image signals are compared with a threshold value from the controller (CPU) 55 to be binarized. The binary data output from the comparator 53 is stored at a predetermined address, specified by an address counter (not shown, provided in the controller 55), of the memory 54. The address counter is driven by the composite clock signal from the CCD drive circuit 51.

The digital image data is then sequentially read from the memory 54 according to addresses designated by the address counter (this may be done in a reverse order from that in which the image data was stored) and is processed in an arithmetic operation section of the controller 55. For example, image processing such as image inversion, profile detection (extraction of only information related to the data symbol 10), dropout correction, and rotation are performed. In addition, a decoder provided in the controller 55 decodes the image data into decoded data corresponding to the type of two-dimensional data symbol 10 (i.e., information represented in the data symbol 10 is decoded). The decoded data or the digital image data may also be output to the host computer 6 through the communications driver 58 or displayed on the display device 59 by the controller 55.

As described above, in the data symbol reader 1, because the high brightness outer frame portion 81 of the symbol read area 8 and the normal brightness inside portion 82 are formed on the readout surface 9, an outline of the symbol read area 8 can be clearly observed. Therefore, the data symbol 10 can be easily and accurately targeted within the symbol read area 8. Thus, there is less chance of a readout error caused by the protrusion of the data symbol 10 from the symbol read area 8. In particular, it is preferable that the symbol read area 8 be sufficiently larger than the data symbol 10 so that the data symbol 10 may be easily positioned at an arbitrary position in the symbol read area 8.

Further, in the data symbol reader 1, a distance between the readout surface 9 and the data symbol reader 1 is set by observing the image of the plane light source 7 formed on the readout surface 9, i.e., observing whether or not an in-focus image is formed, to ensure that that an in-focus image of the data symbol 10 is formed on the light receiving surface of the CCD 33. Because the illumination section 4 is used for illumination, framing, and for setting the distance between the data symbol reader 1 and the readout surface 9, the structure of the data symbol reader is quite simple. In particular, separate structures for illumination, framing, and focusing are not required.

Still further, because the plane light source 7 provides light over a plane, the symbol read area 8 is uniformly illuminated. Uniform illumination provides a more accurate image.

Still further, because the illumination section 4 includes the image forming lens 42, various characteristics of the data symbol reader 1 may be set during or after manufacturing. For example, the size of the image of the plane light source 7 formed on the readout surface 9 can be adjusted by setting a magnification of the image forming lens 42. Also, the distance between the readout surface 9 and the data symbol reader 1, when the light from the plane light source 7 forms an in-focus image on the readout surface 9, can be adjusted by adjusting the focal length of the image forming lens 42, the position of the plane light source 7, the position of the image forming lens 42, and the like.

A data symbol reader 1a according to a second embodiment of the present invention will now be described.

Figure 9:
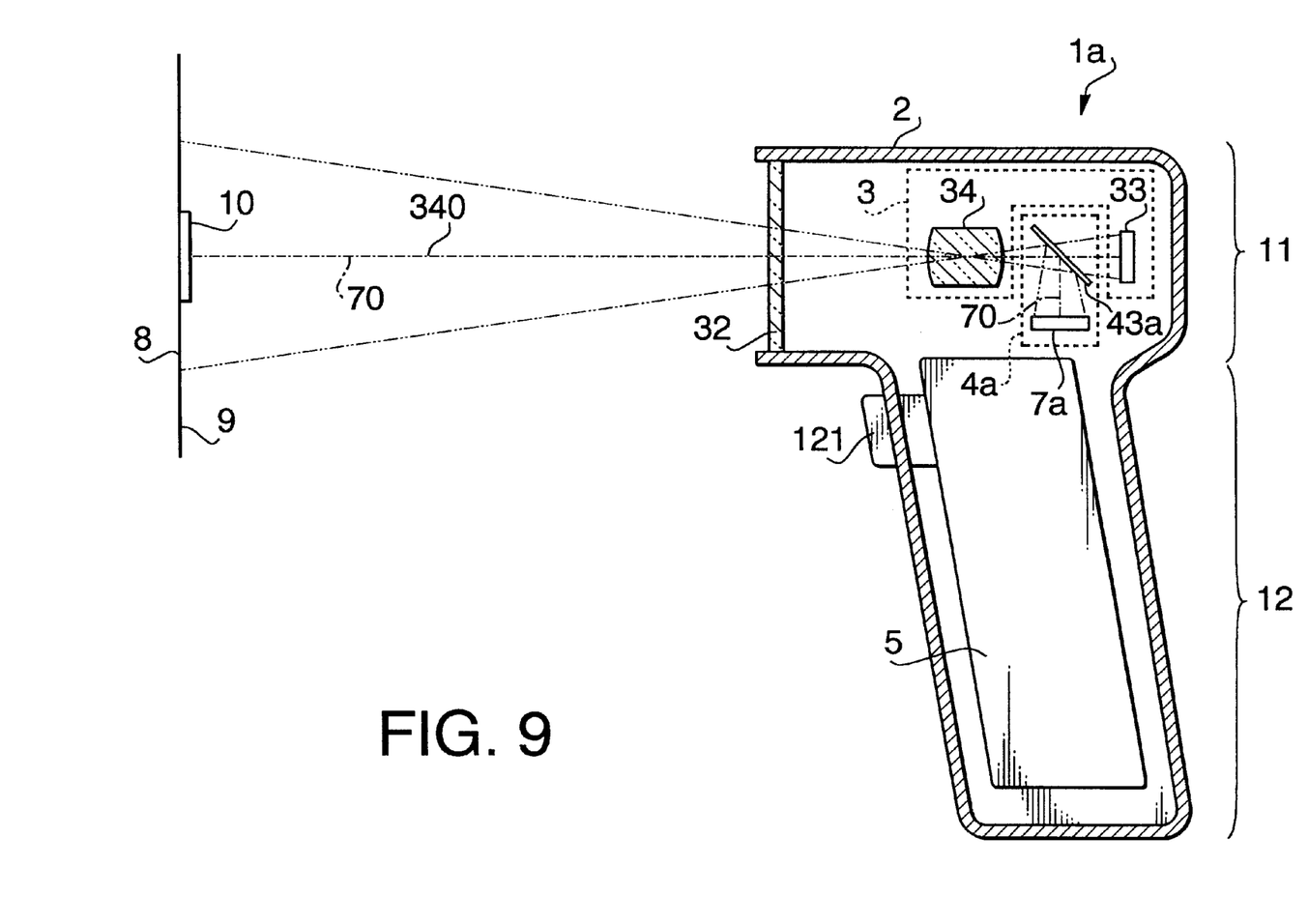
FIG. 9 is a sectional view of a data symbol reader according to a second embodiment of the invention.

FIG. 9 is a sectional view showing the data symbol reader 1a. Elements in common with the data symbol reader 1 according to the first embodiment will not be described.

As shown in FIG. 9, the data symbol reader 1a includes an illumination section 4a that includes a plane light source 7a and a half mirror 43a. In this embodiment, the half mirror 43a is positioned on the optical axis 340 of the image pickup lens 34 and is arranged between the CCD 33 and the image pickup lens 34. The plane light source 7a is arranged perpendicular to the optical axis 340 at a position optically equivalent to the CCD 33, with respect to the image pickup lens 34, through the half mirror 43a.

In the data symbol reader 1a, light from the plane light source 7a is reflected by the half mirror 43a, and is projected onto the readout surface 9 through the image pickup lens 34 to form an image of the plane light source 7a on the readout surface 9. Similar to the first embodiment, the light from the plane light source 7a both illuminates and frames the symbol read area 8. Also, the data symbol reader 1a is arranged such that when an in-focus image of the plane light source 7a is formed on the readout surface 9, an in-focus image of the data symbol 10 will be formed on the CCD 33.

Thus, according to the data symbol reader 1a, it is possible to easily and accurately target the data symbol 10 and to set the distance between the readout surface 9 and the data symbol reader 1a to read an in-focus image of the data symbol 10.

The structure of the data symbol reader 1a is simpler than the structure of the data symbol reader 1 of the first embodiment because the light from the plane light source 7a is projected onto the readout surface 9 through the image pickup lens 34.

An alternative plane light source 7' will be described with reference to FIGS. 10 and 11.

Figure 10:
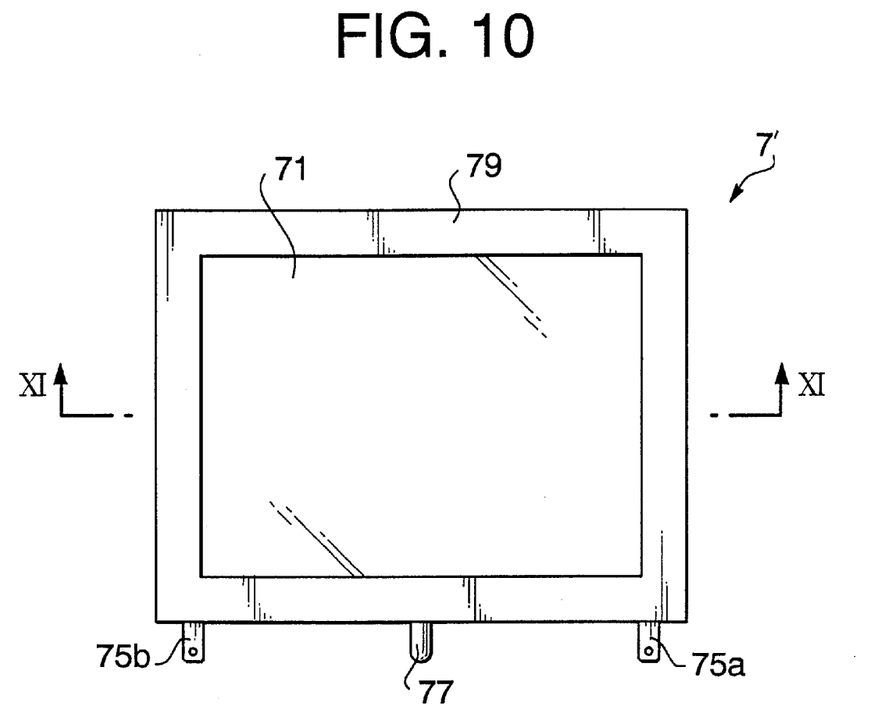
FIG. 10 is a plan view of an alternative plane light source.
Figure 11:
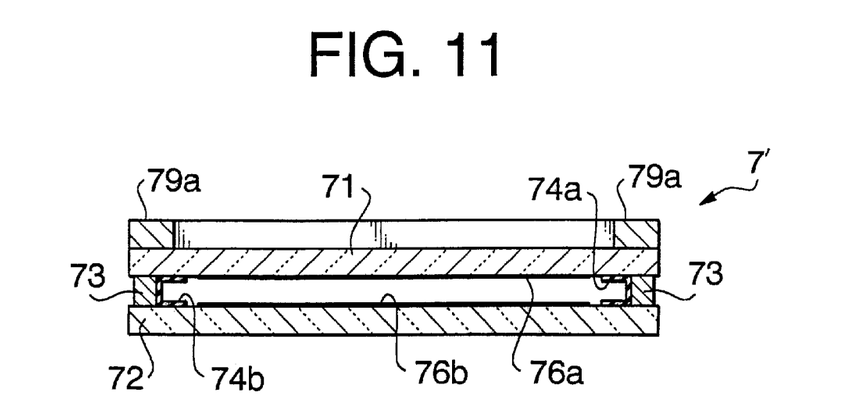
FIG. 11 is a sectional view taken along line XI-XI of FIG. 10.

FIG. 10 is a plan view showing the plane light source 7', and FIG. 11 is a sectional view taken along line XI—XI in FIG. 10. Elements in common with the plane light source 7 of the first embodiment will not be described.

As shown in FIGS. 10 and 11, in the plane light source 7', the diffusion plate 78 of the plane light source 7 of the first embodiment is replaced by a color filter element 79.

The color filter element 79 is similar to the diffusion plate 78 but further includes a color filter portion 79a disposed corresponding to the outer frame portion 81 of the symbol read area 8. Thus, the color of the outer frame portion 81 of the symbol read area 8 is different from the color of the inside portion 82.

The alternative plane light source 7' can be used with the data symbol reader 1 or 1a. By using the plane light source 7', the outline of the symbol read are 8 can be clearly observed because the outer frame portion 81 and the inside portion 82 of the symbol read area 8 can be distinguished by a difference in color. Consequently, targeting of the data symbol 10 can be easily and accurately carried out.

Although the structure and operation of a data symbol reader is described herein with respect to the preferred embodiments, many modifications and changes can be made without departing from the spirit and scope of the invention.

For example, although the respective embodiments are constructed such that a part of the optical axis 70 of the light from the plane light source 7 coincides with the optical axis 340 of the image pickup lens 34, the optical axis 70 of the illuminating light is not required to coincide with the optical axis 340 of the image pickup lens 34.

Also, although the respective embodiments are constructed such that the illumination section 4 indicates a symbol read area 8 having the outer frame portion 81 and the inside portion 82, it is sufficient that the illumination section 4 is constructed such that the light from the light source illuminates the symbol read area 8 and, in some manner, defines the symbol read area 8. As a particular example, the illumination section 4 may be constructed such that only the inside portion 82 of the symbol read area 8 is indicated. Alternatively, the illumination section 4 may be constructed such that the illumination section 4 illuminates the symbol read area 8, and indicates four corners or two sides of the symbol read area 8 on the readout surface 9.

According to the embodiments and alternatives described above, the symbol read area is illuminated and framed such that the data symbol can be easily and accurately targeted.

In particular, when the outer frame portion of the symbol read area is visually distinguishable from the inside portion, by color, brightness, or the like, the symbol read area is clearer and targeting of the data symbol can be performed even more easily and accurately.

Because the data symbol may be accurately targeted, there is less chance of a read error due to incorrect targeting. As a result, the accuracy of reading is improved.

Further, because the light from the light source both illuminates and frames the symbol read area and is used in focusing, it is not necessary to provide systems for each of these functions.

Still further, in the case where the light source is a plane light source, the symbol read area is uniformly illuminated, providing a more accurate image of the data symbol.

The present disclosure relates to subject matter contained in Japanese Patent Application No. HEI 8-269091, filed on Sep. 20, 1996, which is expressly incorporated herein by reference in its entirety.

What is claimed is:

1. A data symbol reader, comprising:
   an image pickup element;
   an image forming optical system for forming an image of a data symbol on a light receiving surface of said image pickup element, the data symbol being positioned on a readout surface; and
   an image projecting optical system that projects a predetermined optical image onto the readout surface, the optical image optically defining a readable area, the image projecting optical system being arranged such that when the symbol reader is positioned so that an image of said predetermined optical image formed on the readout surface comes into focus, an in-focus image of the data symbol to be read is formed on the light receiving surface of the image pick-up element.

2. The data symbol reader according to claim 1, wherein said illuminating means is constructed to optically indicate an outer frame portion of said symbol read area.

3. The data symbol reader according to claim 2, wherein said outer frame portion of said symbol read area is indicated by setting the brightness of the outer frame portion higher than that of an inside portion of said symbol read area.

4. The data symbol reader according to claim 2, wherein said outer frame portion of said symbol read area is indicated by differentiating the color of the outer frame portion from the color of an inside portion of said symbol read area.

5. The data symbol reader according to claim 1, wherein said illuminating means comprise a light source and wherein part of an optical axis of the light from said light source coincides with an optical axis of said image forming optical system.

6. The data symbol reader according to claim 1, wherein said illuminating means comprises a plane light source which emits light from a plane.

7. The data symbol reader according to claim 6, wherein said plane light source comprises a diffusion plate having a first part corresponding to an outer frame portion of the symbol read area and a second part corresponding to an inside portion of the symbol read area, and wherein a transmissivity of the first part of said diffusion plate is higher than a transmissivity of the second part of said diffusion plate.

8. A data symbol reader, comprising:
an image pickup element;
an image forming optical system for forming an image of a data symbol on a light receiving surface of said image pickup element, the data symbol being positioned on a readout surface; and
an image projecting optical system that illuminates the readout surface, and that projects a predetermined optical image onto the readout surface, the predetermined optical image optically defining a readable area, the image projecting optical system being arranged such that when the symbol reader is positioned so that an image of said predetermined optical image formed on the readout surface comes into focus, an in-focus image of the data symbol to be read is formed on the light receiving surface of the image pick-up element.

9. The data symbol reader according to claim 1, wherein said illuminating means comprise a light source and a projecting optical system for projecting light from said light source onto said readout surface, said protecting optical system including a lens for causing the light from said light source to form an image on said readout surface.

10. The data symbol reader according to claim 9, wherein said projecting optical system includes an optical element for reflecting part of the light from said light source onto said readout surface.

11. The data symbol reader according to claim 10, wherein said optical element is arranged on an optical axis of said image forming optical system closer to readout surface than an image pickup lens of said image forming optical system.

12. The data symbol reader according to claim 10, wherein said optical element is arranged on an optical axis of said image forming optical system between an image pickup lens of said image forming optical system and said image pickup element, and wherein the light from said light source is projected onto said readout surface through said image pickup lens of said image forming optical system.

13. The data symbol reader according to claim 9, wherein said lens forms an infocus image on said readout surface when the data symbol reader is held at a distance from the readout surface where an infocus image of the data symbol to be read is formed on said light receiving surface of the image pick-up element.

14. The data symbol reader according to claim 8, in which the illuminating means comprises a plane light source that emits light from a plane.

15. A data symbol reader, comprising:
an image pickup element;
an image forming optical system for forming an image of a data symbol on a light receiving surface of said image pickup element, the data symbol being positioned on a readout surface; and
an optical image projecting means for projecting a predetermined optical image on said readout surface, the predetermined optical image optically defining a readable area, the optical image projecting means being provided such that when the symbol reader is positioned so that an image of said predetermined optical image formed on the readout surface comes into focus, an in-focus image of the data symbol to be read is formed on said light receiving surface of the image pick-up element.

16. The data symbol reader according to claim 15, wherein said optical image optically indicates an area on said readout surface capable of being read.

17. The data symbol reader according to claim 15, wherein part of an optical axis of said optical image projecting means coincides with an optical axis of said image forming optical system.

18. The data symbol reader according to claim 15, wherein said optical image projecting means comprise a light source and a lens for causing the light from said light source to form an image on said readout surface.

19. The data symbol reader according to claim 18, wherein said optical image projecting means further comprise an optical element which is arranged on an optical axis of said image forming optical system for reflecting and projecting said optical image onto the readout surface along said optical axis of said image forming optical system.

20. The data symbol reader according to claim 18, wherein said optical element is arranged between an image pickup lens of said image forming optical system and said image pickup element, so that said optical image is projected onto said readout surface through said image pickup lens of said image forming optical system.

21. The data symbol reader according to claim 15, in which the optical image projecting means comprises a plane light source that emits light from a plane.

22. A data symbol reader, comprising:
an image pickup element;
an image forming optical system that forms an image of a data symbol on a light receiving surface of said image pickup element, said data symbol positioned on a readout surface; and
an image projecting optical system that illuminates a symbol read area capable of being read out, and that projects a predetermined optical image onto the readout surface, the optical image optically defining a readable area; and
a lens positioned so that an image formed on the readout surface comes into focus when the symbol reader is positioned to form an infocus image of the symbol to be read on the light receiving surface of the image pick-up element.

23. The data symbol reader according to claim 22, wherein said illuminator optically indicates an outer frame portion of said symbol read area.

24. The data symbol reader according to claim 23, wherein said outer frame portion of said symbol read area is indicated by a brightness of the outer frame portion being higher than a brightness of an inner portion of said symbol read area.

25. The data symbol reader according to claim 23, wherein said outer frame portion of said symbol read area is indicated by a color of the outer frame portion being different than a color of the inside portion of said symbol read area.

26. The data symbol reader according to claim 22, wherein said illuminator comprises a light source and a projecting optical system for projecting light from said light source onto the readout surface, said projecting optical system including a lens that causes the light from said light source to form an image on the readout surface.

27. The data symbol reader according to claim 26, wherein said projecting optical system includes an optical element that reflects a portion of the light from said light source, and for projecting the reflected light onto the readout surface.

28. The data symbol reader according to claim 27, wherein said optical element is positioned on an optical axis of said image forming optical system and closer to a side of said readout surface than an image pickup lens of said image forming optical system.

29. The data symbol reader according to claim 27, wherein said optical element is positioned on an optical axis of said image forming optical system and between an image pickup lens of said image forming optical system and said image pickup element, light from said light source being projected onto said readout surface through said image pickup lens of said image forming optical system.

30. The data symbol reader according to claim 22, wherein said illuminator includes a light source and wherein a portion of an optical axis of the light from said light source coincides with an optical axis of said image forming optical system.

31. The data symbol reader according to claim 22, wherein said illuminator includes a plane light source whereby light is emitted from a plane.

32. The data symbol reader according to claim 31, wherein said plane light source includes a diffusion plate, a transmissivity of a portion of said diffusion plate corresponding to an outer frame portion of the symbol read area being higher than a transmissivity of a portion of said diffusion plate corresponding to an inside portion of the symbol read area.

33. A data symbol reader, comprising:

an image pickup element;

an image forming optical system that forms an image of a data symbol on a light receiving surface of said image pickup element, said data symbol positioned on a readout surface; and an image projecting optical system that illuminates the readout surface on which a data symbol is positioned, and that projects a predetermined optical image onto the readout surface, the optical image optically defining a readable area, the image projecting optical system being arranged such that when the symbol reader is positioned so that an image of said predetermined optical image formed on the readout surface comes into focus, an in-focus image of the data symbol to be read is formed on the light receiving surface of the image pick-up element.

34. A data symbol reader, comprising:

an image pickup element; and an image forming optical system that projects a predetermined optical image onto a readout surface to optically define a readable area, the image forming optical system being arranged such that when the data symbol reader is positioned such that an image of said predetermined optical image formed on the readout surface by the optical system comes into focus, an in-focus image of the data symbol to be read is formed on the light receiving surface of the image pick-up element.

35. The data symbol reader according to claim 34, wherein said optical image optically indicates an area on said readout surface capable of being read.

36. The data symbol reader according to claim 34, wherein a portion of an optical axis of said optical image projector coincides with an optical axis of said image forming optical system.

37. The data symbol reader according to claim 34, wherein said optical image projector comprises a light source and a lens that causes the light from said light source to form an image on said readout surface.

38. The data symbol reader according to claim 37, wherein said optical image projector further comprises an optical element positioned on an optical axis of said image forming optical system, said optical element reflecting and projecting said optical image onto the readout surface along the optical axis of said image forming optical system.

39. The data symbol reader according to claim 37, wherein said optical element is arranged between an image pickup lens of said image forming optical system and said image pickup element, so that said optical image is projected onto said readout surface through said image pickup lens of said image forming optical system.

40. The data symbol reader according to claim 34, in which the optical image projector comprises a plane light source that emits light from a plane.

* * * * *